Figure 1:
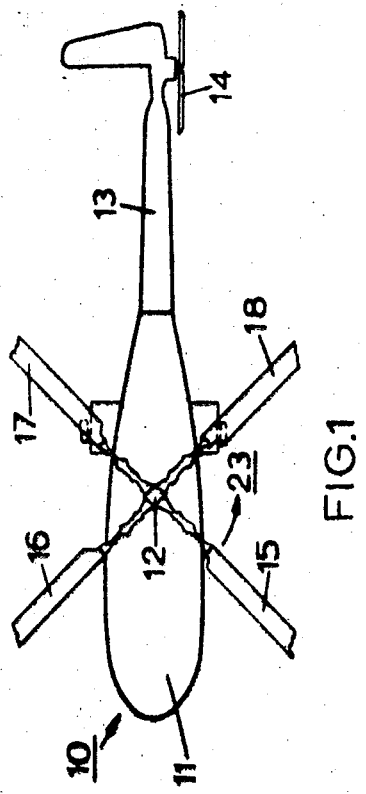

United States Patent [19]
Gear

[11] 3,744,742
[45] July 10, 1973

[54] ROTARY WING AIRCRAFT WITH FOLDING ROTOR BLADES

[75] Inventor: John Philip Gear, Thornford near Sherborne, England

[73] Assignee: Westland Aircraft Limited, Yeovil, Somerset, England

[22] Filed: Nov. 29, 1971

[21] Appl. No.: 202,971

[30] Foreign Application Priority Data
Dec. 18, 1970 Great Britain.................. 60,300/70

[52] U.S. Cl.............................. 244/17.11, 416/142
[51] Int. Cl........................................... B64c 27/50
[58] Field of Search..................... 244/17.11, 17.15, 244/17.17, 17.19, 17.21, 17.23, 120; 416/142, 143

[56] References Cited
UNITED STATES PATENTS

| | | |
|---|---|---|
| 2,068,617 | 1/1937 | Wilford et al..................... 244/17.19 |
| 2,532,683 | 12/1950 | Traver.............................. 244/17.19 |
| 3,029,047 | 4/1962 | Jacobsen et al. ................. 244/17.11 |
| 3,112,088 | 11/1963 | Speechley..................... 244/17.19 X |

*Primary Examiner*—Milton Buchler
*Assistant Examiner*—Paul E. Sauberer
*Attorney*—Roberts B. Larson, William R. Hinds et al.

[57] ABSTRACT

The invention relates to rotary wing aircraft having at least one four-bladed rotor system and discloses means for folding the four rotor blades into a stowed position in which the blades are arranged in two partly overlapping pairs located one pair on each side of the longitudinal centreline of the fuselage.

2 Claims, 3 Drawing Figures

3,744,742

ROTARY WING AIRCRAFT WITH FOLDING ROTOR BLADES

This invention relates to rotary wing aircraft having folding rotor blades, and is applicable both to rotary wing aircraft with single rotors and to those having a plurality of rotors arranged, e.g., in tandem or coaxially.

The many and varied roles of rotary wing aircraft makes provision for the folding of the rotor blades desirable, particularly when the aircraft is to operate from ships and to be stowed below decks, and is also of importance when rotary wing aircraft are to be carried on small ships such as destroyers or cruisers where the aircraft may be housed in a hangar on the deck or tied down on the deck itself, since storage requirements may otherwise prevent such machines from being carried or utilised. The folding of the rotor blades in such instances is preferably such that the blades are stowed within the width of the aircraft to facilitate its positioning and compact stowage in confined spaces, e.g., its positioning on the lift and its handling into a maintenance bay below deck.

As far as I am aware, existing folding blade arrangements supplemented where necessary by fuselage folding do not reduce the flying length of a rotary wing aircraft by more than 35 percent in attaining the folded or stowed configuration of the aircraft. For many purposes this may be insufficient and impose flying strength limitations on the aircraft that may be selected for a particular role.

The object of this invention is to provide a folding arrangement that avoids some of the inadequacies of existing arrangements or prior proposals and which may in certain cases at least permit the attainment of a flying length reduction of about 50 percent.

According to the invention I provide a rotary wing aircraft including a fuselage, at least one lift rotor assembly comprising four rotor blades attached to a rotor head, a tail cone supporting a tail rotor assembly, and means for folding the four lift rotor blades between an extended operational position and a stowed position, wherein with the rotor head positioned so that in azimuth each of the four lift rotor blades lies at substantially 45° to the longitudinal centreline of the fuselage, the two aft positioned blades are folded forward and the two forward positioned blades are folded aft in a substantially horizontal plane so that in the stowed position the four lift rotor blades are arranged in two pairs located one pair on each side of the longitudinal centreline of the fuselage, each pair of blades overlapping along a portion of their lengths.

In preferred embodiments of the invention the folding and unfolding of the rotor blades may be adapted to be carried out manually, but power means may be provided to perform these operations.

An aircraft having a single rotor assembly in accordance with the invention may incorporate fuselage folding and in such cases there will be advantageous reduction of flying length attainable by arranging for fuselage folding to take place about an axis more forwardly located than usual, that is, with a shorter than normal distance between the rotor axis and the fuselage fold line.

Figure 2:
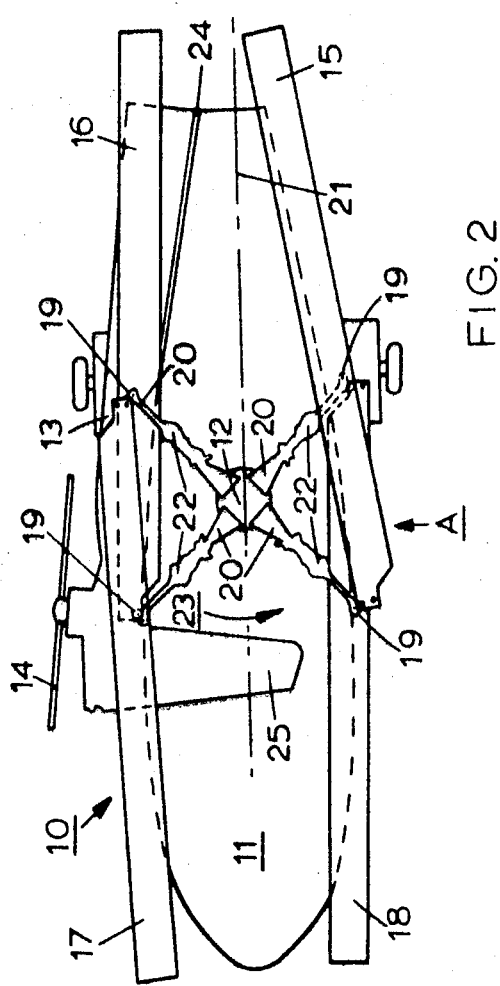
Figure 3:
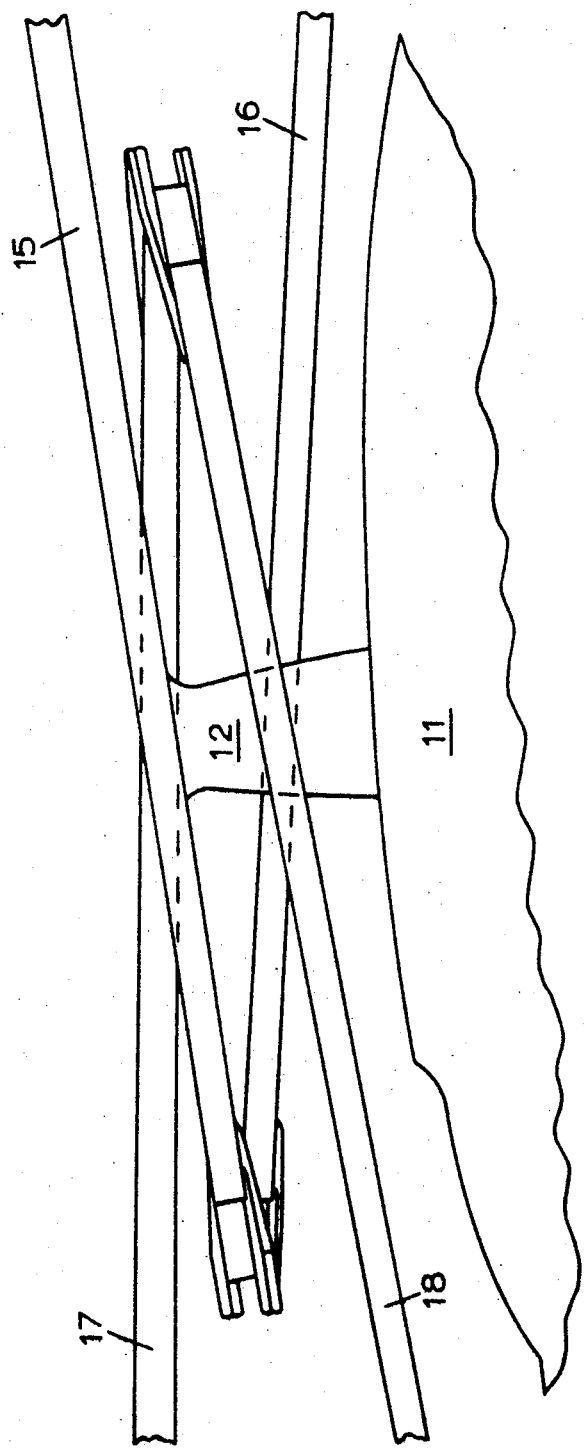

The invention will now be described by way of example only with reference to the accompanying drawings, in which:

FIG. 1 is a plan view of a rotary wing aircraft in the operational configuration, FIG. 2 is a plan view on an enlarged scale of the aircraft of FIG. 1, with its rotor blades and tail cone folded in the stowed configuration, and FIG. 3 is a fragmentary side view on an enlarged scale taken in the direction of arrow A on FIG. 2, and showing the configuration of rotor blades in the folded position.

Referring to FIG. 1, a rotary wing aircraft is generally indicated at 10, and is shown in an operational configuration. The aircraft includes a fuselage 11, a rotor head assembly 12 with four lift rotor blades 15, 16, 17 and 18, and a tail cone assembly 13 supporting a tail rotor assembly 14.

In FIG. 2 the rotor blades 15, 16, 17 and 18 and the tail cone assembly 13 are shown folded into a stowed configuration. Root ends of the four rotor blades 15, 16, 17 and 18 are secured by attachment means 19 at the outer ends of rotor head members 20. In the embodiment illustrated each attachment means 19 comprises a pair of attachment bolts, either of which may be withdrawn to permit hinging of the rotor blades about the other, thus permitting each blade to be folded in either of two directions relative to the attachment means, in or approximately in a substantially horizontal plane corresponding to the operational plane of rotation of the rotor blades.

It will be seen from FIG. 2 that because each blade may be folded in either direction, it is only necessary to position the rotor head assembly 12 before commencing the folding operation so that the rotor head members 20 and their associated rotor blades are at approximately 45° to the longitudinal centreline of the fuselage (indicated at 21); it is not necessary to achieve a unique rotor orientation in azimuth, any one of four positions being acceptable.

When it is desired to fold the rotor blades from their extended operational position (FIG. 1), the appropriate one of the pair of bolts in each attachment means 19 is withdrawn to permit the two forward positioned blades 15 and 16 to be folded aft, and the two aft positioned blades 17 and 18 to be folded forward into the stowed position shown in plan in FIG. 2. In other words, alternate or oppositely arranged rotor blades 15, 17, and 16, 18, are folded in opposite directions so that in the stowed configuration the four blades are arranged in two pairs, 15, 18, and 16, 17, located one pair on each side of and substantially parallel with the longitudinal centreline 21 of the fuselage 11, each pair of blades overlapping along a portion of their lengths at the root ends.

To facilitate the overlapping configuration and to prevent fouling of the blades during the folding operation, it is desirable that the blades moving into overlapping relationship should not move in exactly the same plane; this may be accomplished by suitable skewing of the attachment means 19, or most conveniently by selecting neutral cyclic pitch and applying a degree of collective pitch whereby each attachment means 19 is rotated in the same sense and by an identical amount about feathering hinges 22 located in each of the rotor head members 20.

Bearing in mind the normal direction of rotation of the rotor head assembly 12 as indicated by arrow 23 in FIGS. 1 and 2, the effect of the application of collective pitch on the plane of movement of the rotor blades can be clearly seen from FIG. 3, in which details of the rotor head 12 and the folded tail cone 13 have been omitted for clarity. Rotor blades 15 and 17 can be said to move in a direction towards their leading edges so that because of the application of collective pitch the blades will move through a slightly upward inclined path to the stowed positions shown in FIG. 3, whereas rotor blades 16 and 18 move in a direction towards their trailing edges so that the blades will move through a slightly downward inclined path to the stowed positions shown in FIG. 3. This means that one of each pair of blades 15 and 17 moves through an upward inclination and the other of each pair of blades 16 and 18 moves through a downward inclination so that there is no danger of fouling during the folding operation, and that the overlapping portions of each pair of blades are adequately spaced when in the stowed position, as shown in FIG. 3.

Referring to FIG. 2, the tail cone assembly 13 is shown folded adjacent one side of the fuselage 11. The assembly is arranged to fold about a substantially vertical hinge 24 located forward of the rearmost extent of the folded rotor blades 15 and 16. It will be appreciated that because of the folding arrangement disclosed the rotor blades do not extend so far rearward as with conventional arrangements, so that the hinge 24 is located much further forward than has hitherto been practicable.

The hinge 24 is arranged so that when in the stowed configuration shown in plan in FIG. 2, a spar 25 on the tail cone assembly 13 lies above the fuselage 11 and below the folded blade 17.

In a proposed rotary wing aircraft having a total flying length of 49 ft. 9 ins., incorporation of a folding arrangement as hereinbefore defined and illustrated results in a stowage length of 26 ft. 6 ins., representing a reduction in length of 47 percent. This may usefully be compared with a stowage length of 34 ft. obtainable by conventional blade and fuselage folding; a reduction of less than 32 percent of the flying length. It will be apparent that the important reduction in the stowed length resulting from the present invention is attributable to the feature that each pair of blades overlap along a portion of their length at the root ends.

Blade restraining means may be provided to support the blades in the stowed configuration and may be in the form of cradle assemblies located on the fuselage 11. Alternatively or additionally, blade protection cuffs may be fitted over the outer ends of the members 20 to prevent the blades being damaged by flapping in the stowed configuration.

I claim as my invention:

1. In a rotary wing aircraft, a fuselage and a main rotor system including four rotor blades, each rotor blade being foldably attached at the end of an arm extending radially from a rotor head, wherein with the rotor head positioned so that in azimuth each of the four rotor blades lies at substantially 45° to a longitudinal centreline of the fuselage, the two aft positioned blades are folded forward and the two forward positioned blades are folded aft in substantially horizontal planes so that in the folded position the four blades are arranged in two pairs located one pair on each side of and generally parallel with the longitudinal centreline of the fuselage, each said pair of blades overlapping from their attached ends by an amount substantially equal to the dimension between the ends of two of the arms.

2. A rotary wing aircraft as claimed in claim 1, wherein when folding from the extended to the stowed position one of each pair of lift rotor blades is arranged to move through a slightly upward inclined path and the other of each pair of lift rotor blades is arranged to move through a slightly downward inclined path.

* * * * *